(12) United States Patent
Parkvall et al.

(10) Patent No.: US 9,391,683 B2
(45) Date of Patent: Jul. 12, 2016

(54) LOCALIZED AND DISTRIBUTED TRANSMISSION

(71) Applicant: Telefonaktiebolaget L M Ericsson (publ), Stockholm (SE)

(72) Inventors: Stefan Parkvall, Bromma (SE); Erik Dahlman, Stockholm (SE); Lei Wan, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/580,749

(22) Filed: Dec. 23, 2014

(65) Prior Publication Data

US 2015/0110213 A1 Apr. 23, 2015

Related U.S. Application Data

(63) Continuation of application No. 14/197,481, filed on Mar. 5, 2014, now abandoned, which is a continuation of application No. 12/161,396, filed as application No. PCT/EP2007/000433 on Jan. 18, 2007, now abandoned.

(30) Foreign Application Priority Data

Jan. 18, 2006 (SE) ........................ 0600106

(51) Int. Cl.
*H02B 7/00* (2006.01)
*H04B 7/06* (2006.01)
*H04L 5/00* (2006.01)
*H04W 72/08* (2009.01)
*H04W 72/04* (2009.01)

(52) U.S. Cl.
CPC ................ *H04B 7/06* (2013.01); *H04L 5/0007* (2013.01); *H04L 5/0039* (2013.01); *H04L 5/0041* (2013.01); *H04W 72/042* (2013.01); *H04W 72/087* (2013.01)

(58) Field of Classification Search
CPC ........... H04L 1/02; H04L 1/04; H04L 5/0039; H04L 5/0041; H04L 5/0094; H04W 72/04; H04W 72/0453; H04B 7/12
See application file for complete search history.

(56) References Cited

U.S. PATENT DOCUMENTS

2002/0119781 A1* 8/2002 Li et al. .................. 455/450

* cited by examiner

*Primary Examiner* — Fanghwa Wang

(57) ABSTRACT

The available transmission resources on a downlink-shared channel are divided into resource blocks, each resource block comprising a predetermined number of sub-carriers during a predetermined time period. The resource blocks are subdivided into localized resource blocks and distributed resource blocks. A user requiring sufficient resources can be allocated a plurality of said localized resource blocks. A user who would require only a small number of said localized resource blocks can instead be allocated summits of a plurality of said distributed resource blocks.

11 Claims, 3 Drawing Sheets

US 9,391,683 B2

LOCALIZED AND DISTRIBUTED TRANSMISSION

CROSS-REFERENCE TO RELATED APPLICATIONS

This application is a continuation of U.S. application Ser. No. 14/197,481, filed Mar. 5, 2011, which is a continuation of U.S. application Ser. No. 12/161,396, filed Mar. 25, 2010, which is a 371 of International Application No. PCT/EP2007/000433, filed Jan. 18, 2007, which claims the benefit of Swedish Application No. 0600106-9, filed Jan. 18, 2006, the disclosure of which is incorporated herein by reference.

FIELD OF THE INVENTION

The present invention relates to methods and arrangements in mobile communication systems, such as cellular mobile communication systems, in particular to resource block allocation and distribution on downlink shared channels.

BACKGROUND OF THE INVENTION

The present invention refers in one particular embodiment to localized, resource-block-based transmission on the downlink shared channel of an enhanced UMTS Radio Access Network (E-UTRA). Localised transmission implies that the shared-channel transmission to a certain UE is confined to a set of (physical) resource blocks, where each resource block consists of a certain number $L_{RB}$ of consecutive sub-carriers during one sub frame. The specific set of resource blocks to be used for transmission to a certain UE is selected by the Node B, e.g., based on knowledge of the downlink channel conditions (i.e. channel-dependent scheduling).

Channel-dependent scheduling provides a very efficient means to combat frequency-selective fading on the radio channel by simply dynamically avoiding parts of the spectrum that are subject to momentary deep fades. However, in some cases, channel-dependent scheduling is, for different reasons, not possible or not attractive. One reason can be that data may be targeting more than one UE, in which case there is not one single channel on which the channel-dependent scheduling can be based. Another reason might be that the channel may vary so fast in time, e.g. due to high mobility, that tracking of the instantaneous channel conditions is not possible. Yet another considerable reason might be that the downlink and/or uplink signaling overhead that is associated with channel-dependent scheduling is too "expensive". This could be the case, e.g., for small payloads such as for voice services. If channel-dependent scheduling cannot be used, an exploitation of frequency diversity may be important in order to achieve good link performance.

In the case of localized transmission, frequency diversity can be achieved by simply transmitting on a set of resource blocks that are sufficiently spread in the frequency domain.

SUMMARY OF THE INVENTION

However, it has been observed to be a problem that in some cases the payload may not be large enough to fill more than one or perhaps a few resource blocks, which leads to a limitation of the distribution on a resource-block basis, such that sufficient frequency diversity is not achieved.

Thus, it is an object of the present invention to achieve the benefits of frequency diversity also for transmissions with relatively small payloads. There is thus a need for a transmission scheme where such payloads can be distributed over multiple distributed resource blocks and, as a consequence, in order to efficiently utilize the overall time/frequency grid, data to multiple users can be transmitted within the same physical resource block.

The present invention addresses a straightforward transmission scheme supporting a mix of localized and distributed shared-channel transmission in order to fulfil these requirements.

In one embodiment, the available resources are divided into a plurality of resource blocks, each resource block comprising a predetermined number of sub-carriers during a predetermined time period. The resource blocks are subdivided into localised resource blocks and distributed resource blocks and at least one user can be allocated subunits of a plurality of said distributed resource blocks.

The present invention offers the advantage of a fully distributed transmission scheme to be used as a complement to localized transmission for introduction into the long-term evolution of downlink radio-access schemes with minimum impact on the transmission scheme and with minimum additional signaling.

DESCRIPTION OF THE INVENTION

Figure 1:
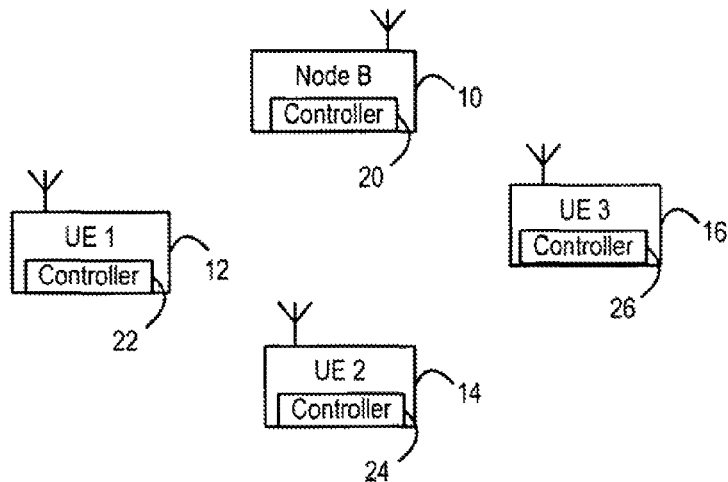
FIG. 1 illustrates a part of a cellular communications network in accordance with an embodiment of the present invention.

FIG. 1 illustrates a part of a cellular telecommunications system in accordance with the invention. In the illustrated embodiment, the system is part of an enhanced UMTS Radio Access Network (E-UTRA), using an Orthogonal Frequency Division Multiple (OFDM) Access scheme, but the invention can be used in other types of network, as will be apparent. In the illustrated part of the system, there is shown a network node, which, in this case, is a Node B 10, which is in wireless communication with three illustrated user equipments (UEs) 12, 14, 16. As shown in FIG. 1, the Mode B 10 includes a controller 20, while the UEs 12, 14, 16 include respective controllers 22, 24, 26. These controllers perform the methods described in more detail below, for determining the allocation of resources.

The bandwidth available for transmissions from, the Node B 10 is divided into a number of sub-carriers, and transmissions from the Node B 10 to the UEs 12, 14, 16 can take place on particular ones of these sub-carriers. The specific set of sub-carriers to be used for transmission to a certain UE is selected by the Mode B itself in this embodiment, although this selection can be made by another network node, if desired. The term sub-carrier is used to mean any small part of the available spectrum, and it will be noted that the invention is applicable to modulation schemes in which the bandwidth is explicitly divided into predefined sub-carriers, or to modulation schemes in which there is no such predefined division.

Figure 2:
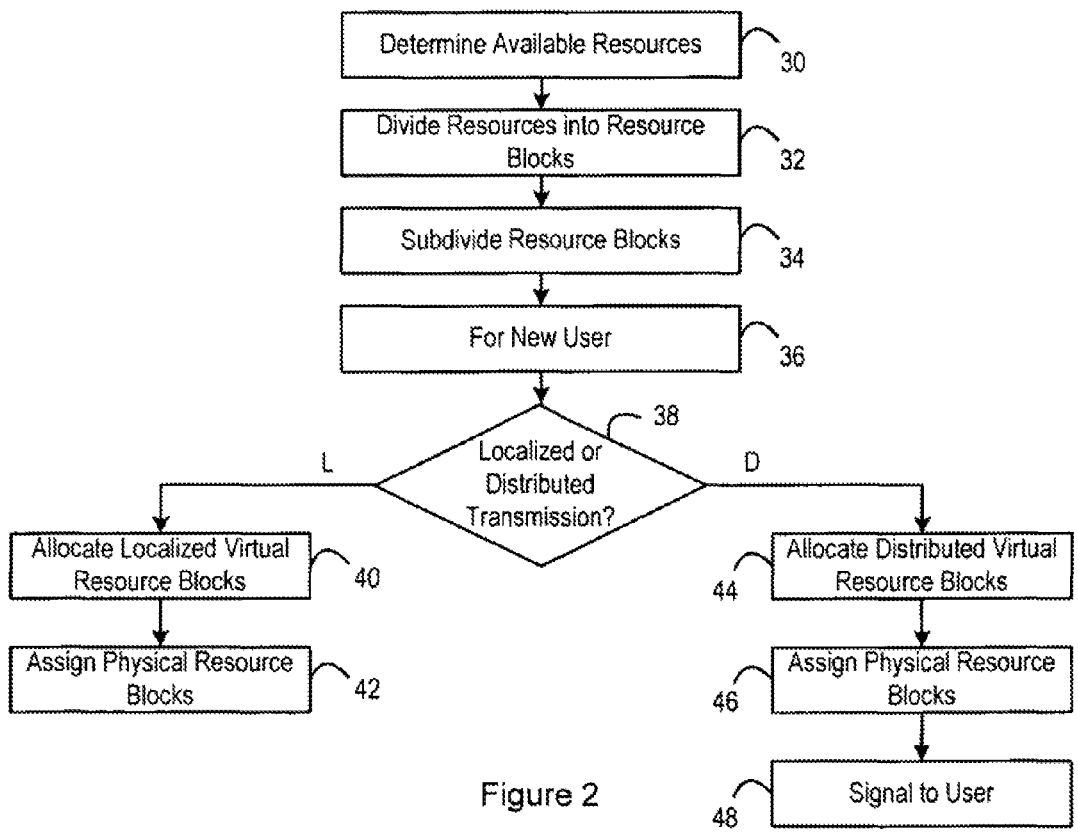
FIG. 2 is a flow chart, illustrating a method in accordance with an embodiment of the present invention.

FIG. 2 illustrates a method in accordance with an aspect of the invention. In this illustrated embodiment, the method is performed in the Node B 10, although some or all of the steps can be performed in other nodes of the network, with the results being communicated to the Node B 10 for implementation.

In step 30, the physical resources available for transmission on the downlink from the Node B 10 to the various UEs 12, 14, 16, etc are determined. For example, the physical resources may include a particular frequency bandwidth, which is divided into a number of sub-carriers. The number of sub-carriers may be determined in advance by the system specification.

In step 32, the available physical resources are divided into physical resource blocks. For example, each physical resource block may include a predetermined number of sub-carriers and a predetermined time period. Again, these parameters may be determined in advance by the system specification. In one illustrated embodiment of the invention, each physical resource block includes twelve consecutive sub-carriers, and lasts for a sub-frame period ($T_{nf}$) of 0.5 ms. More generally, a physical resource block may consist of a number L of consecutive sub-carriers and, as a consequence, may contain $M=n \times L$ time/frequency symbols per sub-frame, where n is the number of OFDM symbols in a sub-frame (and hence, in the illustrated embodiment, $M=7 \times L$ symbols, or $M=6 \times L$ symbols in the case of a long cyclic prefix). Although not of importance for this specific discussion, for simplicity we assume that physical resource blocks make up the entire sub-carrier space, i.e. each sub-carrier belongs to a physical resource block.

Figure 3:
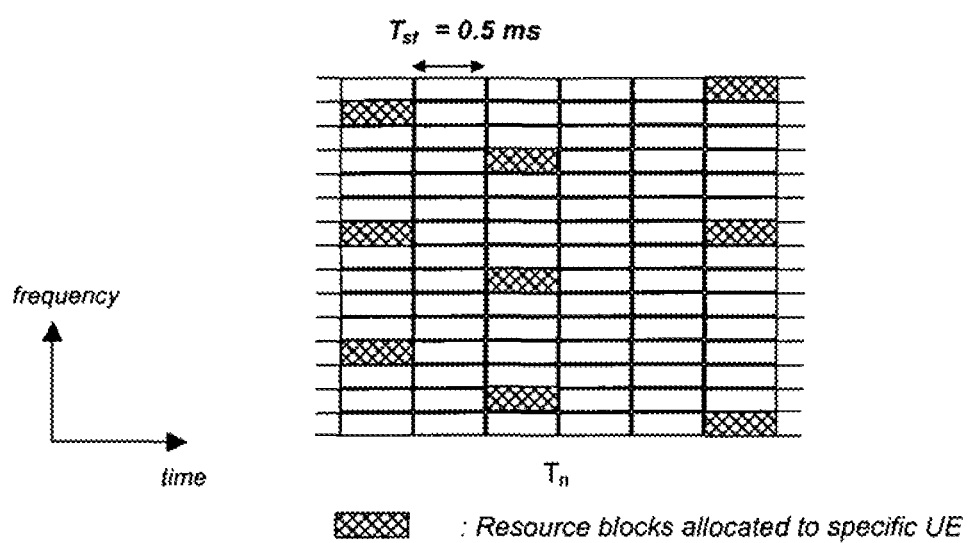
FIG. 3 illustrates the spreading of allocated resource blocks in the frequency domain in order to achieve frequency diversity, in accordance with an aspect of the method of FIG. 2.

FIG. 3 illustrates the division of the available physical resources into physical resource blocks.

In step 34, the physical resource blocks are subdivided into localized physical resource blocks and distributed physical resource blocks, the uses of which will foe described in more detail below. For reasons that will become apparent below, it is advantageous for the distributed physical resource blocks not to be consecutive physical resource blocks, but to be located at intervals amongst said physical resource blocks.

The following describes one possible, non-limiting, example embodiment of an algorithm for determining more exactly which physical resource blocks should be assigned as distributed physical resource blocks. More specifically, it is assumed that there are a number of physical resource blocks, indexed, e.g., 0, 1, 2, ..., ($N_{RB}$−1) of which a number $N_{DRB}$ are assigned to be distributed physical resource blocks. The number $N_{DRB}$ can be determined by the Node B 10 itself, or by another network node. The indices of the $N_{DRB}$ distributed physical resource blocks that are assigned for distributed transmission are then given by the expression i*C, where i denotes a value in the sequence 0, 1, 2, ..., ($N_{DRB}$−1), and the integer C is given by the expression $$C = \left\lfloor \frac{N_{RB}-1}{N_{DRB}-1} \right\rfloor.$$

Thus, in an illustrative example, where there are 10 physical resource blocks and 3 of them are assigned to be physical resource blocks, that is, $N_{RB}$=10 and $N_{DRB}$=3, C=4, and so the physical resource blocks indexed 0, 4, 8 are assigned to be distributed physical resource blocks. The other physical resource blocks, indexed 1, 2, 3, 5, 6, 7, 9 are assigned to be localized physical resource blocks.

In step 36, a new user is considered by the Node B. Specifically, in step 38, it is determined whether the user is suitable for distributed transmission or localized transmission. The method of the present invention seeks, in particular embodiments, to achieve frequency diversity for the transmissions to each user equipment. Where the transmissions to a user equipment will occupy a reasonably large number of resource blocks, that user can be assigned to localized transmission, and more specifically the transmissions to that user can be assigned to multiple physical resource blocks that are located at intervals amongst the available physical resource blocks.

This is illustrated, in FIG. 3, in which the resource blocks allocated to one specific UE, which has been assigned to localised transmission, are shown cross-hatched. Thus, during a sub-frame period transmissions to that UE are assigned three non-consecutive physical resource blocks. This provides an acceptable degree of frequency diversity for the transmissions to this UE.

However, where the transmissions to a user equipment will occupy only one or a small number of resource blocks, if that user is assigned to localized transmission, then frequency diversity will not be achieved. Embodiments of the invention therefore provide a way of achieving this frequency diversity, even in this case.

Thus, if it is determined that the user is suitable for localised transmission, the process passes to step 40, in which localised virtual resource blocks are assigned. Each localised virtual resource block also consists of M symbols. Furthermore, each localised virtual resource block is mapped one-to-one to the set of physical resource blocks that are assigned to localized transmission. The number of physical resource blocks assigned to localized transmission (denoted $N_{LRB}$) is thus equal to the number of localized virtual resource blocks.

Thus, in step 42, the physical resource blocks corresponding to the allocated localized virtual resource blocks are assigned to that user.

If it is determined in step 38 that the user is suitable for distributed transmission, the process passes to step 44, in which distributed virtual resource blocks are assigned. Then, in step 46, the physical resources corresponding to the allocated distributed virtual resource blocks are assigned to that user. Each distributed virtual resource block also consists of M symbols. Each of a total of $N_{DRB}=N_{RB}-N_{LRB}$ distributed virtual resource blocks are mapped to the remaining $N_{DRB}$ physical resource blocks (the physical resource blocks assigned for distributed transmission). However, in contrast to localised virtual resource blocks, this mapping is not one-to-one. Instead, each distributed virtual resource block is mapped to a plurality of the physical resource blocks assigned for distributed transmission. Thus, subunits of a plurality of the distributed physical resource blocks are allocated to that user, as described in more detail below.

In this illustrated embodiment, every one of the $N_{DRB}$ distributed virtual resource blocks is mapped to every one of the plurality of the physical resource blocks assigned for distributed transmission.

The mapping of a distributed virtual resource block to the $N_{DRB}$ physical resource blocks assigned for distributed transmission is as follows:

1) Each distributed virtual resource block is split into a number $N_{DRB}$ of parts $P_{i,j}$ of almost equal size, where i is the resource-block number and j is the part number. Each physical resource block assigned for distributed transmission is similarly divided into subunits $S_{k,l}$. For example, where, as here, each physical resource block includes 12 sub-carriers and there are 3 resource blocks assigned for distributed transmission, each of these subunits includes 4 sub-carriers.

2) In this illustrated embodiment, the part $P_{i,j}$ (part j of distributed virtual resource block i) is mapped to the summit $S_{k,l}$ (subunit l of distributed physical resource block k), where the distributed physical resource blocks are indexed sequentially 0, 1, ..., $N_{DRB}$, and where k=[(i+j) mod $N_{DRB}$] and l=j.

Figure 4:
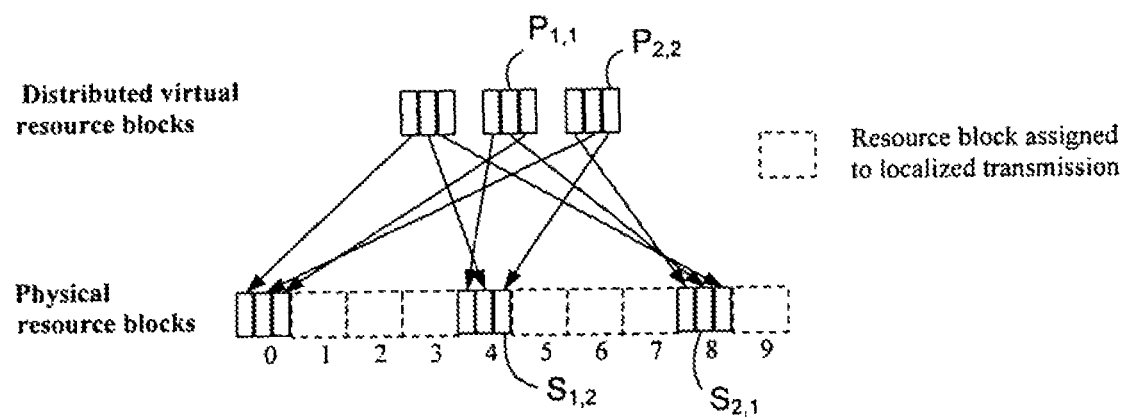
FIG. 4 illustrates an example of a mapping of distributed virtual resource blocks to physical resource blocks, in accordance with an aspect of the method of FIG. 2.

FIG. 4 illustrates this mapping of distributed virtual resource blocks to physical resource blocks by means of an example embodiment assuming the values $N_{DRB}$=3 and $N_{RB}$=10. Thus, the three distributed physical resource blocks, namely the physical resource blocks indexed 0, 4, 8, are re-indexed 0, 1, 2 for these purposes, and then, for example, the part $P_{1,1}$ (part 1 of distributed virtual resource block 1) is mapped to the subunit $S_{2,1}$ (subunit 1 of distributed physical resource block 2, that is, the original physical resource block 8) i and the part $P_{2,2}$ (part 2 of distributed virtual resource block 2) is mapped to the subunit $S_{1,2}$ (subunit 2 of distributed physical resource block 1, that is, the original physical resource block 4).

Thus, when a user requires a data transmission capacity that is equal to that of one resource block, and is therefore allocated one virtual resource block, the transmissions occur in multiple physical resource blocks, thereby achieving frequency diversity even for such users.

In this example, each virtual resource block is partially mapped to every one of the distributed physical resource blocks. In other embodiments, where there are a larger number of distributed physical resource blocks, it may be preferable to map each distributed virtual resource block to only a subset of the distributed physical resource blocks.

Thus, there is provided a method whereby a Node B, or other network node, can determine which resources to allocate to a user. Further, the same procedure can be performed simply in the relevant user equipment, which only needs to know the value of $N_{DRB}$, i.e. the number of distributed virtual resource blocks, in order to know exactly what physical resource blocks are assigned for distributed transmission. Thus, in step 48 of the process shown in FIG. 2, information is provided to the user equipment, allowing it to determine which physical resource blocks are assigned for distributed transmission. In one embodiment, this value of $N_{DRB}$ is signaled to the user equipment via higher-layer signaling. Based on a knowledge of the number of resource blocks and of the number of distributed resource blocks, the user equipment can then calculate the number of localized resource blocks, and moreover can determine which of the resource blocks are to be distributed resource blocks.

Alternatively, the relevant network node can signal to the user equipment the number of localised resource blocks, allowing the user equipment to calculate the number of distributed resource blocks.

For signaling of dynamic scheduling information, it is necessary to identify each localized and distributed virtual resource block. It is assumed that each physical resource block has an appropriate form of identity. According to one conceivable embodiment this can be ordered numbers. For each localized virtual resource block, the resource-block identity is the same as the identity of the physical resource block to which the localised virtual resource block is mapped to (physical resource block 1, 2, 3, 5, 6, 7, and 9 in FIG. 2). In case of distributed virtual resource blocks the resource-block identity is the same as the identity of the physical resource block to which the first part $P_{i,j}$ of the distributed virtual resource block is mapped. Referring to the example according to FIG. 4, the first resource block thus gets an identity 0, the second resource block gets identity 4, and the third gets identity 8. Note that these are exactly the numbers missing from the sequence of localized virtual resource blocks.

Once the process shown in FIG. 2 has been completed for one user, it can be repeated for another user. If it is determined that that user is also suitable for distributed transmission, then it will be allocated a different distributed virtual resource block, but it may be allocated sub-carriers in the same physical resource blocks as the first user. For example, based on the illustrated case shown in FIG. 4, and where each physical resource block includes twelve consecutive sub-carriers, the first user may be allocated sub-carriers 0-3 in physical resource block 0, sub-carriers 4-7 in physical resource block 4, and sub-carriers 8-11 in physical resource block 8, while the second user may be allocated sub-carriers 8-11 in physical resource block 0, sub-carriers 0-3 in physical resource block 4, and sub-carriers 4-7 in physical resource block 8. Thus, each user is able to achieve a desirable frequency diversity.

Moreover, the localized and distributed resource blocks share the same "identity space" and the support for distributed transmission can thus be introduced without adding any additional dynamic signaling compared to what is anyway needed for localized transmission.

It should be noted that, strictly speaking, nothing prevents different UEs from assuming (being signaled) different values of $N_{DRB}$. That would simply imply that, for certain user equipments, certain physical resource blocks are used for localized transmission while, for other user equipments, the same physical resource blocks may be used for distributed transmission. In this case, the Node B dynamic scheduler must ensure that collisions do not happen.

There is therefore provided a method for achieving frequency diversity, even for users that require only a relatively small transmission capacity.

The invention claimed is:

1. A method for achieving frequency diversity for scheduled transmissions of resource blocks on a downlink-shared channel between a network node and a plurality of terminals in a telecommunication system, comprising:

determining physical resources available for transmission on the downlink-shared channel, the physical resources comprising a plurality of physical resource blocks each comprising L consecutive sub-carriers and n consecutive symbols per sub-carrier;

assigning each of the physical resource blocks for either localized transmission or distributed transmission, wherein at least two of the physical resource blocks are assigned for localized transmission and at least two of the physical resource blocks are assigned for distributed transmission;

determining whether a first data transmission capacity required for downlink transmission to a first terminal among the plurality of terminals is greater than the predetermined threshold, and in response to determining that the first data transmission capacity is greater than the predetermined threshold, mapping each of a plurality of localized virtual resource blocks associated with the first terminal to a plurality of the physical resource blocks that have been assigned for localized transmission, wherein each of the localized virtual resource blocks comprises M=L×n symbols, and the localized virtual resource blocks are mapped one-to-one to the plurality of physical resource blocks that have been assigned for localized transmission;

determining whether a second data transmission capacity required for downlink transmission to a second terminal among the plurality of terminals is greater than the predetermined threshold, and in response to determining that the second data transmission capacity is not greater than the predetermined threshold, mapping each of at least one distributed virtual resource block associated with the second terminal to a plurality of the physical resource blocks that have been assigned for distributed transmission, wherein each of the at least one distributed virtual resource blocks comprises M symbols;

wherein the mapping of the at least one distributed virtual resource block is performed by splitting each of the at least one distributed virtual resource blocks into a number of parts, and the parts are mapped respectively to all of the physical resource blocks that have been assigned for distributed transmission; and transmitting information from the network node to the plurality of terminals according to the mapping of localized virtual resource blocks associated with the first terminal and the mapping of the at least one distributed virtual resource block associated with the second terminal.

2. An arrangement in a network node of a telecommunication system, comprising at least one processor and memory collectively configured to perform the method of claim 1.

3. The method of claim 1, wherein mapping each of at least one distributed virtual resource blocks comprises:

determining a total number $N_{RB}$ of the physical resource blocks;

determining a number $N_{DRB}$ of the physical resource blocks that have been assigned for distributed transmission; and determining a position of each of the physical resource blocks that have been assigned for distributed transmission as i*C, where i denotes a value in the sequence 0, 1, 2, ..., ($N_{DRB}$−1), and C is an integer defined according to the equation $$C = \left\lfloor \frac{N_{RB} - 1}{N_{DRB} - 1} \right\rfloor.$$

4. The method of claim 3, wherein mapping each of the at least one distributed virtual resource blocks comprises:

splitting each of the at least one distributed virtual resource blocks into the number $N_{DRB}$ of parts $P_{i,j}$, where i is an index of a physical resource block to which part $P_{i,j}$ is to be mapped and j is an index of part $P_{i,j}$ within the at least one distributed virtual resource blocks; and mapping each part $P_{i,j}$ to a subunit $S_{k,l}$ of a corresponding one of the physical resource blocks that have been assigned for distributed transmission, where k is an index of the corresponding one of the physical resource blocks that have been assigned for distributed transmission, and l is an index of subunit $S_{k,l}$, wherein the physical resources that have been assigned for distributed transmission are indexed sequentially 0, 1, ..., $N_{DRB}$, k=[(i+j) mod $N_{DRB}$], and l=j.

5. The method of claim 1, wherein the first data transmission capacity is a number of virtual resource blocks to be occupied by localized transmission, and the second data transmission capacity is a number of virtual resource blocks to be occupied by distributed transmission.

6. The method of claim 1, further comprising:

determining whether a third data transmission capacity required for downlink transmission to a third terminal among the plurality of terminals is greater than the predetermined threshold, and in response to determining that the third data transmission capacity is not greater than the predetermined threshold, mapping each of at least one distributed virtual resource block associated with the third terminal to a plurality of the physical resource blocks that have been assigned for distributed transmission, wherein each of the at least one distributed virtual resource blocks comprises M symbols, and wherein the plurality of physical resource blocks to which the distributed virtual resource block associated with the third terminal is mapped is not the same as the plurality of physical resource blocks to which the distributed virtual resource block associated with the second terminal is mapped.

7. The method of claim 1, further comprising:

determining whether a third data transmission capacity required for downlink transmission to a third terminal among the plurality of terminals is greater than the predetermined threshold, and in response to determining that the third data transmission capacity is not greater than the predetermined threshold, mapping each of at least one distributed virtual resource block associated with the third terminal to a plurality of the physical resource blocks that have been assigned for distributed transmission, wherein each of the at least one distributed virtual resource blocks comprises M symbols, and wherein the plurality of physical resource blocks to which the distributed virtual resource block associated with the third terminal is mapped is the same as the plurality of physical resource blocks to which the distributed virtual resource block associated with the second terminal is mapped.

8. An apparatus configured to achieve frequency diversity for scheduled transmissions of resource blocks on a downlink-shared channel between a network node and a plurality of terminals in a telecommunication system, comprising:

at least one controller configured to (a) determine physical resources available for transmission on the downlink-shared channel, the physical resources comprising a plurality of physical resource blocks each comprising L consecutive sub-carriers and n consecutive symbols per sub-carrier, (b) assign each of the physical resource blocks for either localized transmission or distributed transmission, wherein at least two of the physical resource blocks are assigned for localized transmission and at least two of the physical resource blocks are assigned for distributed transmission, (c) determine whether a first data transmission capacity required for downlink transmission to a first terminal among the plurality of terminals is greater than the predetermined threshold, and in response to determining that the first data transmission capacity is greater than the predetermined threshold, map each of a plurality of localized virtual resource blocks associated with the first terminal to a plurality of the physical resource blocks that have been assigned for localized transmission, wherein each of the localized virtual resource blocks comprises M=L×n symbols, and the localized virtual resource blocks are mapped one-to-one to the plurality of physical resource blocks that have been assigned for localized transmission, and (d) determine whether a second data transmission capacity required for downlink transmission to a second terminal among the plurality of terminals is greater than the predetermined threshold, and in response to determining that the second data transmission capacity is not greater than the predetermined threshold, map each of at least one distributed virtual resource block associated with the second terminal to a plurality of the physical resource blocks that have been assigned for distributed transmission, wherein each of the at least one distributed virtual resource blocks comprises M symbols; wherein the mapping of the at least one distributed virtual resource block is performed by splitting each of the at least one distributed virtual resource blocks into a number of parts, and the parts are mapped respectively to all of the physical resource blocks that have been assigned for distributed transmission; and wherein the apparatus is a network node and further comprises a transmitter configured to transmit information from the network node to the plurality of terminals according to the mapping of localized virtual resource blocks associated with the first terminal and the mapping of the at least one distributed virtual resource block associated with the second terminal.

9. The apparatus of claim 8, wherein mapping each of at least one distributed virtual resource blocks comprises:

determining a total number $N_{RB}$ of the physical resource blocks;

determining a number $N_{DRB}$ of the physical resource blocks that have been assigned for distributed transmission; and determining a location of each of the physical resource blocks that have been assigned for distributed transmission as i*C, where i denotes a value in the sequence 0, 1, 2, ..., ($N_{DRB}$−1), and C is an integer defined according to the equation $$C = \left\lfloor \frac{N_{RB} - 1}{N_{DRB} - 1} \right\rfloor.$$

10. The apparatus of claim 9, wherein mapping each of the at least one distributed virtual resource blocks comprises:

splitting each of the at least one distributed virtual resource blocks into the number $N_{DRB}$ of parts $P_{i,j}$ where i is an index of a physical resource block to which part $P_{i,j}$ is to be mapped and j is an index of part $P_{i,j}$ within the at least one distributed virtual resource blocks; and mapping each part $P_{i,j}$ to a subunit $S_{k,l}$ of a corresponding one of the physical resource blocks that have been assigned for distributed transmission, where k is an index of the corresponding one of the physical resource blocks that have been assigned for distributed transmission, and l is an index of subunit $S_{k,l}$, wherein the physical resources that have been assigned for distributed transmission are indexed sequentially 0, 1, ..., $N_{DRB}$, k=[(i+j) mod $N_{DRB}$], and l=j.

11. The apparatus of claim 8, wherein the first data transmission capacity is a number of virtual resource blocks to be occupied by localized transmission, and the second data transmission capacity is a number of virtual resource blocks to be occupied by distributed transmission.

* * * * *